United States Patent Office 2,874,350
Patented Feb. 17, 1959

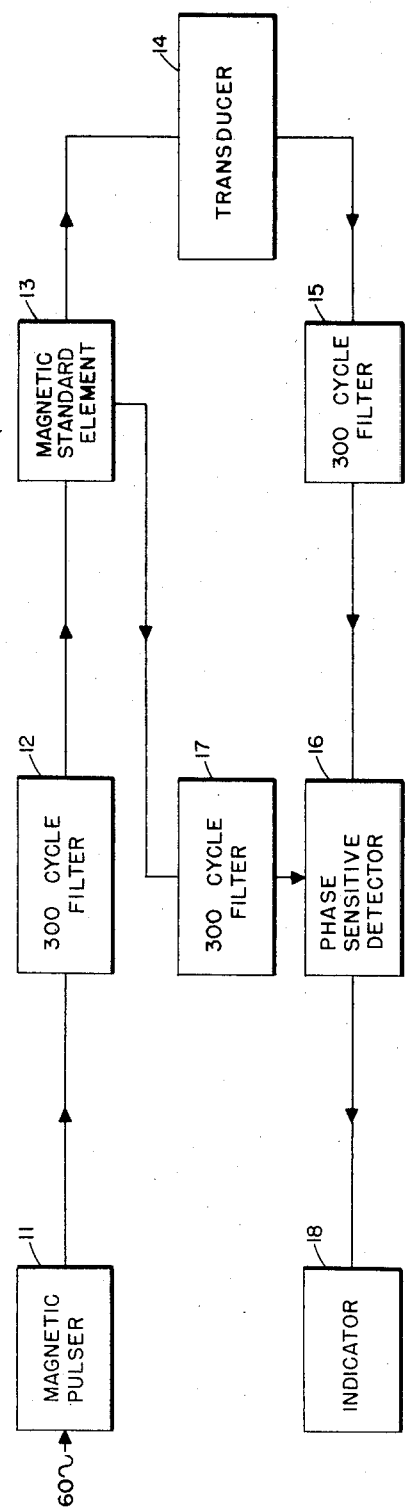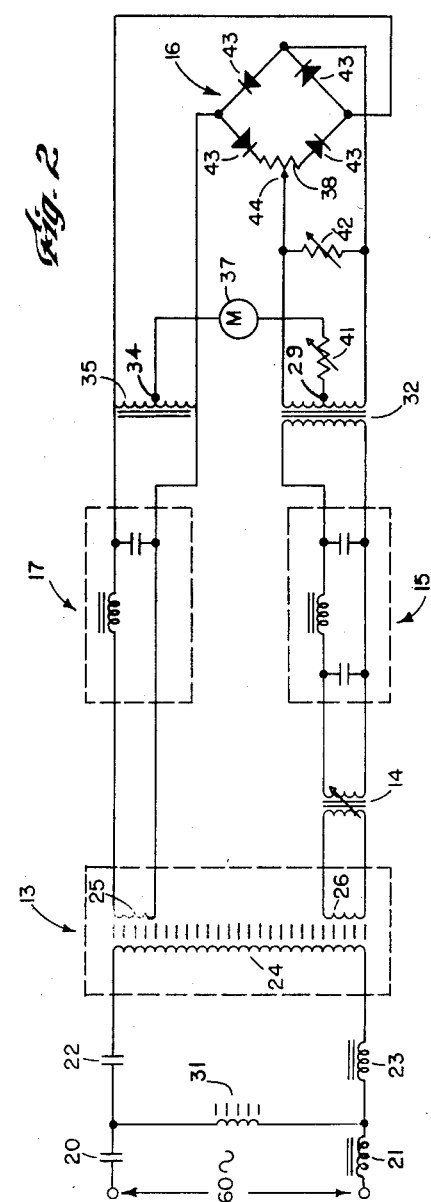

2,874,350
MEASURING SYSTEM

John A. Maynard, Winchester, and William A. Rote, Needham, Mass., assignors, by mesne assignments, to Minneapolis-Honeywell Regulator Company, a corporation of Delaware Application August 17, 1954, Serial No. 450,473

12 Claims. (Cl. 324—57)

This invention relates generally to measuring systems and more particularly to measuring systems which include a transducer of the type requiring alternating current (A. C.) excitation.

A convenient method of determining the magnitude of a physical quantity is to translate the quantity into an electrical signal of predetermined amplitude and to indicate directly the amplitude of the electrical signal. By way of example, a transducer known as a microsyn is often utilized to measure rotational movement, the amplitude and phase of the signal transmitted by the microsyn being representative of the amount and direction of rotation relative to a fixed position. One of the difficulties encountered with such a system, as exemplified above, is that its accuracy depends to a large extent on the regulation of the excitation voltage applied to the transducer. Consequently, it has been found necessary, in the past, to provide relatively complex voltage regulators including one or more electron tubes to stabilize the applied voltage. Since it is well known that these electron tubes will not function indefinitely, conventional systems of this type including electron tubes have not been as reliable as they might have been otherwise. Another difficulty that has been encountered is alternating current (A. C.) pickup from external sources which combines with the signal from the transducer so as to cause an inaccurate indication of the transducer signal. This difficulty is particularly acute where remote indications are required as in telemetering applications.

It is an object of this invention, therefore, to provide a more reliable measuring system of the type wherein an A. C. excited transducer is utilized.

It is another object of this invention to provide a more accurate system of the above type.

It is a further object to provide a relatively simple and inexpensive measuring system adapted for use with an A. C. excited transducer.

The novel features of this invention, together with still further objects and advantages thereof, will be more readily apparent when considered in connection with the accompanying drawing wherein:

Fig. 1 is a block diagram of the measuring system of this invention;

Fig. 2 is a schematic diagram of the measuring system of this invention.

Referring now to the drawing wherein like elements are designated by the same reference characters, there is illustrated in Fig. 1 a magnetic pulser 11 which provides relatively sharp pulses of energy to a filter 12 when energized with 60 cycle alternating current (A. C.) from any convenient source, not shown. Filter 12 is of the resonant type and is tuned to the fifth harmonic, preferably of the A. C. source. Consequently, there will be present at the output of filter 12 an A. C. voltage having a frequency of 300 cycles per second. This voltage is impressed on a magnetic standard element 13 which provides a substantially constant output voltage of fundamental frequency as will be explained more fully in connection with Fig. 2. Connected to standard element 13 is a transducer 14 for representing the magnitude of some physical quantity in terms of an electrical signal. For example, the transducer might comprise a resistance bridge for measuring temperature or a capacitance bridge for measuring the spatial separation of adjacent objects. In the preferred embodiment illustrated, transducer 14 actually comprises a microsyn for measuring rotation movement. Since the microsyn transducer 14 also provides a basis for determining the direction of rotation as well as the amount, namely, the phase of the signal transmitted, standard element 13 in addition to supplying excitation voltage to transducer 14, provides a reference signal for phase comparison with the transducer signal. In order to make such phase comparison, standard element 13 and transducer 14 are each connected to a phase sensitive detector 16 through additional 300 cycle filters 17 and 15, respectively. Filters 17 and 15 serve to transmit the transducer signal and reference signal to detector 16 in a predetermined phase relation as is required for proper operation of detector 16 and to eliminate frequency components generated by standard element 13 having frequencies different from 300 cycles. Finally, detector 16 is coupled to an indicator 18, which provides indications of the magnitude and phase of the voltage derived by detector 16.

Referring now to Fig. 2 wherein the measuring system of this invention is illustrated in more detail, it is seen that a capacitor 20 and an inductor 21 are connected in series between a source of 60 cycle A. C. power and a saturable reactor 31. Coupled to reactor 31 through the series combination of another capacitor 22 and inductor 23 is a primary winding 24 of a saturable transformer 13. Transformer 13 which comprises the magnetic standard element of Fig. 1 includes two secondary windings 25 and 26. Secondary windings 26 of transformer 13 is connected to transducer 14.

Transducer 14 comprises a transformer wherein the coefficient of coupling may be varied according to the amount a shaft is rotated, such device being known as a microsyn. In one position of the shaft, the coefficient coupling is zero, whereas in some other position the coefficient of coupling will have a finite positive or negative value depending on the amount and sense of the deviation from the zero or neutral position. Consequently, the amplitude and phase of the signal transmitted by transducer 14 will be representative of the amount and direction of shaft rotation. To detect the signal from transducer 14, there is provided phase sensitive detection means including four unilateral conducting devices or diodes 43 arranged in a bridge 16. Interposed between two adjacent diodes 43 is a potentiometer 38 having a movable arm 44, which serves as one of the four connecting points of the bridge. Transducer 14 is coupled between movable arm 44 and the connecting point opposite thereto through a pi section filter 15 and a transformer 32.

Secondary winding 25 of saturable transformer 13 provides a reference signal for comparison with the signal transmitted by transducer 14 in order that phase sensitive detection may be accomplished. To this end, secondary winding 25 is coupled to an inductor 35 through a single section inductor input filter 17, and inductor 35 is in turn coupled between the remaining two connecting points of the bridge 16. Finally, a meter 37 having a bidirectional movement is coupled between a center tap 34 of inductor 35 and a center tap 29 of transformer 32, the latter being associated with the output or secondary winding of transformer 32. An adjustable resistor 41 in series with meter 37 and another adjustable resistor 42 in parallel with the secondary winding of transformer 32 are provided for calibration purposes as will become more readily apparent with reference to the following description of the operation of the system according to this invention.

In operation, capacitor 20 and inductor 21 are tuned to 60 cycles so that a relatively large driving voltage is impressed across reactor to cause complete saturation of the core during a large portion of each half cycle. As a result, the waveform of the supply voltage becomes distorted, the voltage across reactor 31 including relatively large voltage spikes. Since capacitor 22 and inductor 23 are tuned to 300 cycles, the resonant circuit provided thereby is effectively shock excited into oscillation at 300 cycles per sec. by these voltage spikes, so that the voltage appearing across the primary winding 24 of saturable transformer 13 is essentially a 300 cycle voltage, comprising the 5th harmonic component of the 60 cycle supply voltage. Very little 300 cycle voltage or other harmonic voltages are permitted to enter the 60 cycle lines powering the circuit, owing to the selective action of capacitor 20 and inductor 21 which are resonant at 60 cycles as previously mentioned.

Transformer 13 is provided with a core wherein saturation occurs relatively early and wherein the flux density at saturation is relatively constant from one cycle to the next. Core material having a rectangular hysteresis loop reacts in this way. It can be shown mathematically that with such core material the work required to move from the positive B maximum to the negative B maximum (that is between points on the hysteresis loop representing positive and negative maximum values of flux density) is a constant and that the fundamental component of voltage induced in the secondary winding will also be constant. For this reason, the fundamental or 300 cycle voltage appearing across the secondary windings 25 and 26 of transformer 13 will remain very nearly constant irrespective of fluctuations in the 60 cycle supply voltage. Thus, there are available for powering transducer 14 and for phase comparison purposes stable voltages of 300 cycle per second frequency. Filter 17 insures that only the 300 cycle voltage is transmitted to inductor 35 as a reference, all other frequency components as well as 60 cycle A. C. which may be picked up by the interconnecting lines being rejected. Preferably, rather than first filtering the voltage across winding 26 for like reason, this voltage is applied to transducer 14 and then filtered by means of filter 15, the latter having a 300 cycle pass-band like filter 17. This sequence avoids the necessity for impedance matching ahead of transducer 14 and yet insures that the magnitude of the voltage applied to transformer 32 remains constant so long as the coefficient of coupling of transducer 14 is unchanged. In this way, the amplitude of the voltage applied to transformer 32 will be truly representative of the coefficient of coupling and independent of line voltage changes and substantially all A. C. pickup from sources disassociated with the circuit.

Since the coefficient of coupling and therefore the voltage impressed across the primary of transformer 32 will in turn be representative of the amount and sense of some angular deviation relative to a fixed or neutral position, it remains to detect the amplitude and phase of this voltage and thereby obtain an indication of such angular deviation. This is accomplished by combining in the phase sensitive detection means the voltage induced in the secondary of transformer 32, which may be termed the signal voltage and the voltage across inductor 35 which may be termed the reference voltage. In the preferred embodiment of the invention illustrated in Fig. 2, the phase sensitive detection means comprises bridge circuit 16 and meter 37 operating in conjunction with inductor 35 and transformer 32. Such a detector is often referred to as a phase sensitive ring demodulator and is well known to those skilled in the art. When no signal voltage is present, indicating that the transducer shaft is in the neutral position, no current flows through meter 37. Potentiometer 38 insures this result since it may be adjusted to compensate for any differences in the impedance characteristics of diodes 43. When the transducer shaft is positioned off the neutral, however, a signal voltage will be present and its amplitude will be representative of the amount of the deviation from the neutral position. Furthermore, the signal voltage will be either in phase or out of phase with the reference voltage according to the sense of the deviation, that is the direction of rotation from the neutral. Assuming that the sense of the deviation is such that the signal and reference voltages are in phase, then a direct current will flow downwardly through meter 37 whereas the meter current will flow in the reverse direction in the case of a deviation of opposite sense. Provided that the reference voltage amplitude is made substantially greater than the maximum amplitude of the signal voltage, the direct currents in each of these cases will be substantially proportional to the signal voltage, thereby providing an accurate indication of the amount and direction of shaft rotation in transducer 14. Phase sensitive detection in this manner is preferred because of its relative simplicity, but as will be apparent to those skilled in the art, other types of conventional phase sensitive detectors may also be utilized. If a type of transducer is used which provides signals of varying amplitudes but of constant phase, phase sensitive detectors may be eliminated entirely, of course, and ordinary detection means provided such as a half wave or full wave rectifier.

In so-called telemetering applications where it is required to provide indications at a remote location with respect to transducer 14, the entire system with the exception of transducer 14, may be situated at the remote location, if desired. Due to the inherent high sensitivity and accuracy of the system, indications at distances of several miles, for example, may be obtained. Because of losses in the transmission lines, however, the maximum amplitude of the signal voltage will depend to some extent on the actual distance between transducer 14 and the remainder of the system. Adjustable resistors 41 and 42 are provided to compensate for this effect. Accordingly, by means of the resistors 41 and 42, the meter current produced by the maximum value of the signal voltage, whatever that value may be, is adjusted to equal the full scale deflection current of the meter 37. Suitable adjustment of resistors 41 and 42 will also preserve the calibration of the meter 14 for other values of signal voltages. As an alternative to placing transducer 14 and the remainder of the system at different locations, only meter 37 may be situated remotely if desired. This arrangement is generally preferable where the distance between the point of measurement and point of indication exceeds several miles. Were the transducer to be located remotely in this latter case, the attenuation and phase shift in the lines interconnecting the transducer would be excessive thereby adversely affecting the accuracy of the system. By locating the meter remotely, however, the line length may be increased considerably before the amount of attenuation becomes significant because of the relatively high resistance of the meter.

It is apparent that other conventional filtering arrangements different from those illustrated by numerals 15 and 17 may also be utilized. In fact, if a more complex type of filter having a constant impedance characteristic adapted to match transformer 13 and transducer 14 were utilized between winding 26 and transducer 14, filter 15 being eliminated, certain advantages would be obtained from filtering the voltage across winding 26 before impressing it on transducer 14. Similar modifications of this nature, within the spirit and scope of the invention will occur to those skilled in the art.

Therefor what is claimed is:

1. A measuring system including a non-linear impedance element to distort the waveform of an alternating current voltage so as to produce harmonic components thereof; a saturable transformer having a primary winding and at least one secondary winding, said transformer being adapted to provide a substantially constant fundamental component of output voltage irrespective of input voltage fluctuations; a series resonant circuit connected between said primary winding and said impedance element, said circuit being resonant at a frequency corresponding to the frequency of a selected one of said harmonic components; a transducer coupled to said secondary winding, said transducer being adapted to provide an output signal representative of a physical quantity; detection means coupled to said transducer; a filter coupled between said detection means and said secondary winding, the pass-band of said filter including the resonant frequency of said resonant circuit, and the rejection band of said filter including all harmonics and sub-harmonics of said resonant frequency; and indicating means responsive to the voltage derived by said detection means.

2. A measuring system including a saturable reactor to distort the waveform of an alternating current voltage so as to produce harmonic components thereof; a saturable transformer having a primary winding and at least one secondary winding, said transformer being adapted to provide a substantially constant fundamental component of output voltage irrespective of input voltage fluctuations; a series resonant circuit connected between said primary winding and said reactor, said circuit being resonant at a frequency corresponding to the frequency of a selected one of said harmonic components, a transducer coupled to said secondary winding, said transducer producing an output signal representative of a physical quantity; a filter coupled to said transducer for transmitting only the component of said output signal having a frequency equal to the resonant frequency of said resonant circuit; a detector coupled to said filter for deriving a direct current voltage having an amplitude substantially proportional to the amplitude of the output signal component transmitted; and a meter connected to said detector for indicating the amplitude of said direct current voltage.

3. A measuring system according to claim 2 wherein the core of said saturable transformer is comprised of material having a substantially rectangular hysteresis loop.

4. A measuring system including means to distort the waveform of an alternating current voltage source so as to produce harmonic components thereof; a saturable transformer having a primary winding and two secondary windings, said transformer being adapted to provide a substantially constant fundamental component of output voltage irrespective of input voltage fluctuations; means including said means to distort for impressing on said primary winding an input voltage comprising one of said harmonic components of selected frequency; a transducer coupled to one of said secondary windings; said transducer being adapted to provide a signal whose amplitude is representative of the amount of a deviation from a predetermined physical quantity, and whose phase is representative of the sense of said deviation; phase sensitive detection means; first filter means for transmitting to said detection means only the component of said output signal having a frequency equal to the resonant frequency of said resonant circuit; second filter means for transmitting to said detection means only the component of the voltage induced across the other one of said secondary windings having a frequency equal to the resonant frequency of said resonant circuit; and indicating means coupled to said phase sensitive detection means, said detection means deriving a direct current voltage representing in amplitude and polarity the amplitude and phase of said output signal, and said indicating means providing an indication of said direct current voltage.

5. A measuring system including a saturable reactor to distort the waveform of an applied alternating current voltage so as to produce harmonic components thereof; a saturable transformer having a primary winding and two secondary windings, said transformer being adapted to provide a substantially constant fundamental component of output voltage irrespective of input voltage fluctuations; a series resonant circuit coupled between said primary winding and said saturable reactor, said circuit being resonant at a frequency corresponding to the frequency of a selected one of said harmonic components; a microsyn transducer coupled to one of said secondary windings; a phase sensitive detector having first and second input circuits and an output circuit; a first filter coupled between said transducer and said first input circuit to reject components of the signal from said transducer having frequencies different from the resonant frequency of said resonant circuit; a second filter coupled between the other one of said secondary windings and said second input circuit, said second filter having rejection characteristics similar to said first filter; and an indicator coupled to said output circuit.

6. A measuring system according to claim 5 wherein the core of said saturable transformer is comprised of material having a substantially rectangular hysteresis loop.

7. A measuring system according to claim 5 wherein said first input circuit includes a transformer having a center tapped secondary winding; and said second input circuit includes a center tapped inductor.

8. A measuring apparatus comprising a saturable impedance frequency multiplier, a saturable voltage regulating transformer having a primary winding and a pair of secondary windings, means coupling said frequency multiplier to said primary winding, a transducer having an input and an output, means coupling said input to one of said secondary windings, a phase discriminator, means coupling said output to said phase discriminator, and means coupling the other of said secondary windings to said phase discriminator.

9. A measuring apparatus comprising a saturable impedance frequency multiplier, a saturable voltage regulating transformer having a primary winding and a pair of secondary windings, means coupling said frequency multiplier to said primary winding, a transducer having an input and an output, means coupling said input to one of said secondary windings, a phase discriminator, means coupling said output to said phase discriminator, a signal filter, and means including said filter coupling the other of said secondary windings to said phase discriminator.

10. A measuring apparatus comprising a saturable transformer having a primary winding and a pair of secondary windings, an alternating current source of power, a condenser, an inductor, means including said condenser and said inductor coupling said source to said primary winding so that there will appear on said secondary windings an amplitude regulated harmonic signal whose frequency is a function of the magnitude of said condenser and said inductor, a phase discriminator having two sets of input terminals, means coupling one set of input terminals to one of said secondary windings, means coupling the other of said secondary windings to an electrical signal transducer, and means coupling the output of said transducer to the other set of input terminals of said phase discriminator.

11. A measuring apparatus comprising a saturable transformer having a primary winding and a pair of secondary windings, a series resonant input circuit including said primary winding, said resonant circuit including a condenser and an inductor adapted to connect said primary winding to an alternating source of power so that the secondary windings of said transformer will have an amplitude regulated harmonic frequency signal thereon, a phase discriminator having two sets of input terminals, means coupling one of said secondary windings directly to one of said sets of input terminals, a phase shifting transducer connected to the other of said secondary windings and having an output whose amplitude and phase is a function of the magnitude of an input variable, and means coupling said output of said transducer to the other of said sets of input terminals of said phase discriminator.

12. Apparatus as defined in claim 11 wherein a first filter is connected between one of said secondary windings and one of said sets of phase discriminator input terminals and a second filter is connected between the other of said secondary windings and the other of said sets of phase discriminator input terminals, both said first and second filters passing the selected harmonic signal from said saturable transformer.

References Cited in the file of this patent

UNITED STATES PATENTS

| | | |
|---|---|---|
| 2,209,064 | Nyquist | July 23, 1940 |
| 2,394,892 | Brown | Feb. 12, 1946 |
| 2,437,639 | Floyd | Mar. 9, 1948 |
| 2,534,802 | Smith | Dec. 19, 1950 |
| 2,706,274 | Boyer | Apr. 12, 1955 |
| 2,709,806 | Boyer | May 31, 1955 |